(12) United States Patent
Gal et al.

(10) Patent No.: US 11,640,421 B2
(45) Date of Patent: May 2, 2023

(54) COVERAGE ANALYSIS WITH EVENT CLUSTERING

(71) Applicant: INTERNATIONAL BUSINESS MACHINES CORPORATION, Armonk, NY (US)

(72) Inventors: Raviv Gal, Kamon (IL); Avi Ziv, Haifa (IL); Giora Simchoni, Bethlehem Haglilit (IL)

(73) Assignee: International Business Machines Corporation, Armonk, NY (US)

( * ) Notice: Subject to any disclaimer, the term of this patent is extended or adjusted under 35 U.S.C. 154(b) by 695 days.

(21) Appl. No.: 16/411,542

(22) Filed: May 14, 2019

(65) Prior Publication Data

US 2020/0364254 A1 Nov. 19, 2020

(51) Int. Cl.
*G06F 16/00* (2019.01)
*G06F 16/35* (2019.01)
*G06N 20/10* (2019.01)
*G06F 40/30* (2020.01)

(52) U.S. Cl.
CPC .......... *G06F 16/355* (2019.01); *G06F 16/358* (2019.01); *G06F 40/30* (2020.01); *G06N 20/10* (2019.01)

(58) Field of Classification Search
CPC ...... G06F 16/355; G06F 16/358; G06F 40/30; G06F 11/3676; G06F 40/284; G06F 40/295; G06F 16/353; G06N 20/10; G06N 20/00; G06N 7/005
See application file for complete search history.

(56) References Cited

U.S. PATENT DOCUMENTS

| | | | |
|---|---|---|---|
| 7,331,007 B2 | 2/2008 | Fine | |
| 8,019,586 B2 | 9/2011 | Fournier | |
| 8,121,827 B2* | 2/2012 | Azatchi | G06F 30/20 703/19 |
| 9,594,672 B1 | 3/2017 | Dusanapudi | |
| 9,891,281 B1 | 2/2018 | Kinderman | |
| 2007/0168727 A1* | 7/2007 | Fournier | G01R 31/318314 714/25 |
| 2018/0114249 A1* | 4/2018 | Malkin | G06Q 30/0261 |
| 2021/0218748 A1* | 7/2021 | Morin | H04L 63/102 |

OTHER PUBLICATIONS

Azatchi et al., "Advanced Analysis Techniques for Cross-Product Coverage", IEEE Transactions on Computers, vol. 55, No. 11, Nov. 2006, pp. 1367-1379.
Mell et al., "The NIST Definition of Cloud Computing," Recommendations of the National Institute of Standards and Technology, NIST Special Publication 800-145, Sep. 2011, pp. 1-7.

* cited by examiner

*Primary Examiner* — Ashish Thomas
*Assistant Examiner* — Suman Rajaputra
(74) *Attorney, Agent, or Firm* — Anthony M. Pallone

(57) ABSTRACT

A computer that receives a set of names of coverage events. The computer creates, by a machine learning-based technique, groups from the set of received names of the coverage events based on the set of names of the coverage events. The computer generates a cross product coverage model from the created groups and identifies subgroups of uncovered events for each of the created groups.

15 Claims, 5 Drawing Sheets

COVERAGE ANALYSIS WITH EVENT CLUSTERING

BACKGROUND

The present invention relates, generally, to the field of computing, and more particularly to improving coverage analysis of a functional verification based on clustering, by machine learning technique, of the coverage events and mapping the clusters into cross-product coverage spaces.

Functional verification is a method for testing, design and verification of various electronic components such as a processor. Most of the verification is done by generating a massive amount of tests using random tests generators. The use of advanced random test generators increases the quality of generated tests but cannot detect the areas of the design that were not tested.

Coverage analysis is a technique that helps to monitor the quality of testing and directs the test generators to create tests that cover areas that were not adequately tested. Typically, coverage analysis points to areas that were not adequately tested and allows to change the test plans in order to better test the untested areas during a validation process.

Cross-product functional coverage is a coverage analysis technique that determines a list of coverage events that comprises all possible combinations of values for a given set of attributes. For example, coverage analysis checks all possible combinations of requests and responses sent to or received from a memory subsystem.

SUMMARY

According to one embodiment, a method, computer system, and computer program product for event clustering is provided. The present invention may include a computer that receives a set of names of coverage events. The computer creates, by a machine learning-based technique, groups from the set of received names of the coverage events based on the set of names of the coverage events. The computer generates a cross product coverage model from the created groups and identifies subgroups of uncovered events for each of the created groups.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
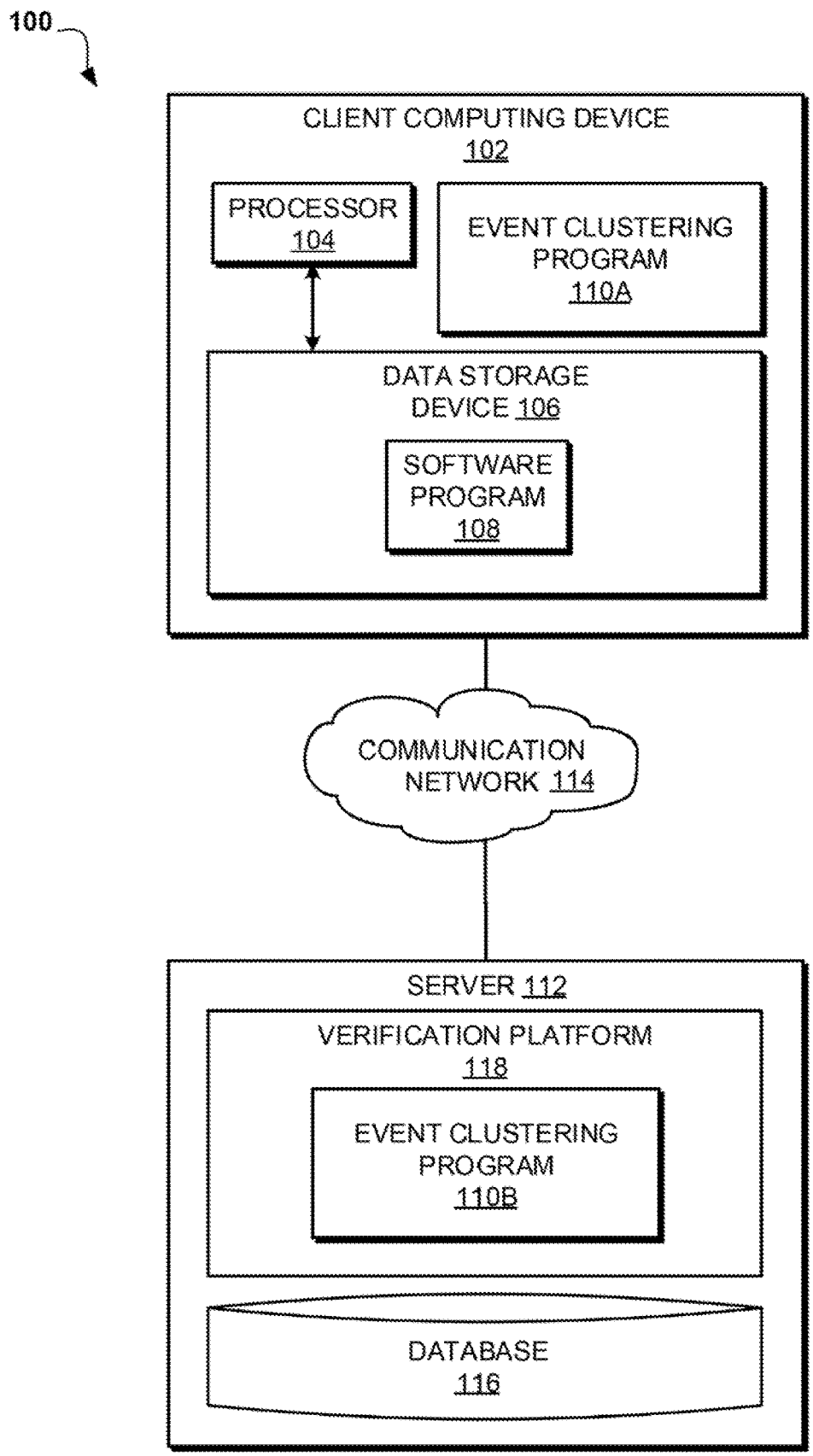
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to improving coverage analysis based on clustering of the coverage events, by a machine learning technique, and mapping the clusters into cross-product coverage spaces. The following described exemplary embodiments provide a system, method, and program product to, among other things, apply data analytics techniques to group coverage events in order to determine clusters of uncovered (unhit) events. Therefore, the present embodiment has the capacity to improve the technical field of verification and coverage analysis, where the coverage analysis is based on clustering of the coverage events and mapping the clusters into cross-product coverage spaces by a machine learning-based technique in order to determine large coverage holes in instances when the coverage events are individually defined.

As previously described, coverage analysis points to an areas that were not adequately tested and allows to change the test plans in order to better test the untested areas during a validation process. Cross-product functional coverage is a coverage analysis that determines a list of coverage events that comprises all possible combinations of values for a given set of attributes. For example, coverage analysis checks all possible combinations of requests and responses sent to or received from a memory subsystem.

Test areas that were not tested by the test generators are called coverage holes. Identifying large and important coverage holes is a time-consuming process that requires expertise in the design and verification environment.

As such, it may be advantageous to, among other things, implement a system that may determine uncovered holes based on clustering a set of events according to their names and mapping the clusters into a cross-product spaces. This technique may be used in the verification of any hardware design, such as high-end servers and enables an improvement in the quality of coverage analysis and helps to identify environmental problems.

According to one embodiment, an event clustering program may receive a set of names of the coverage events and create groups of coverage events based on the event's name using a machine learning-based technique. Then, the event clustering program may generate a cross-product coverage model and identify subgroups of uncovered events for each of the created groups and display the identified subgroups (coverage "holes") to a user.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to determine uncovered holes based on clustering a set of events according to their names and mapping the clusters into cross-product spaces.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and an event clustering program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 3, the client computing device 102 may include internal components 302a and external components 304a, respectively.

The server 112 may be a laptop computer, netbook computer, personal computer (PC), a desktop computer, or any programmable electronic device or any network of programmable electronic devices capable of hosting and running an a verification platform 118 that may incorporate an event clustering program 110B and a database 116 and communicating with the client computing device 102 via the communication network 114, in accordance with embodiments of the invention. In another embodiment, the event clustering program 110B may be a standalone software that is capable of accessing the verification data of the verification platform 118. The verification platform 118 may be an automatic tool (a combination of software and hardware) that produces a large amount of data that is essential for understanding the state and progress of the verification process. As will be discussed with reference to FIG. 3, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the event clustering program 110A, 110B may be a program capable of performing event clustering in order to determine uncovered events. Event clustering program 110A, 110B may cluster the events into cross-products by applying a K-means algorithm on the words in the coverage event names and then maps the clusters into cross-product spaces, and uses domain-specific post-process improvements to enhance the size, density, and quality of the cross-products. The event clustering method is explained in further detail below with respect to FIG. 2.

Figure 2:
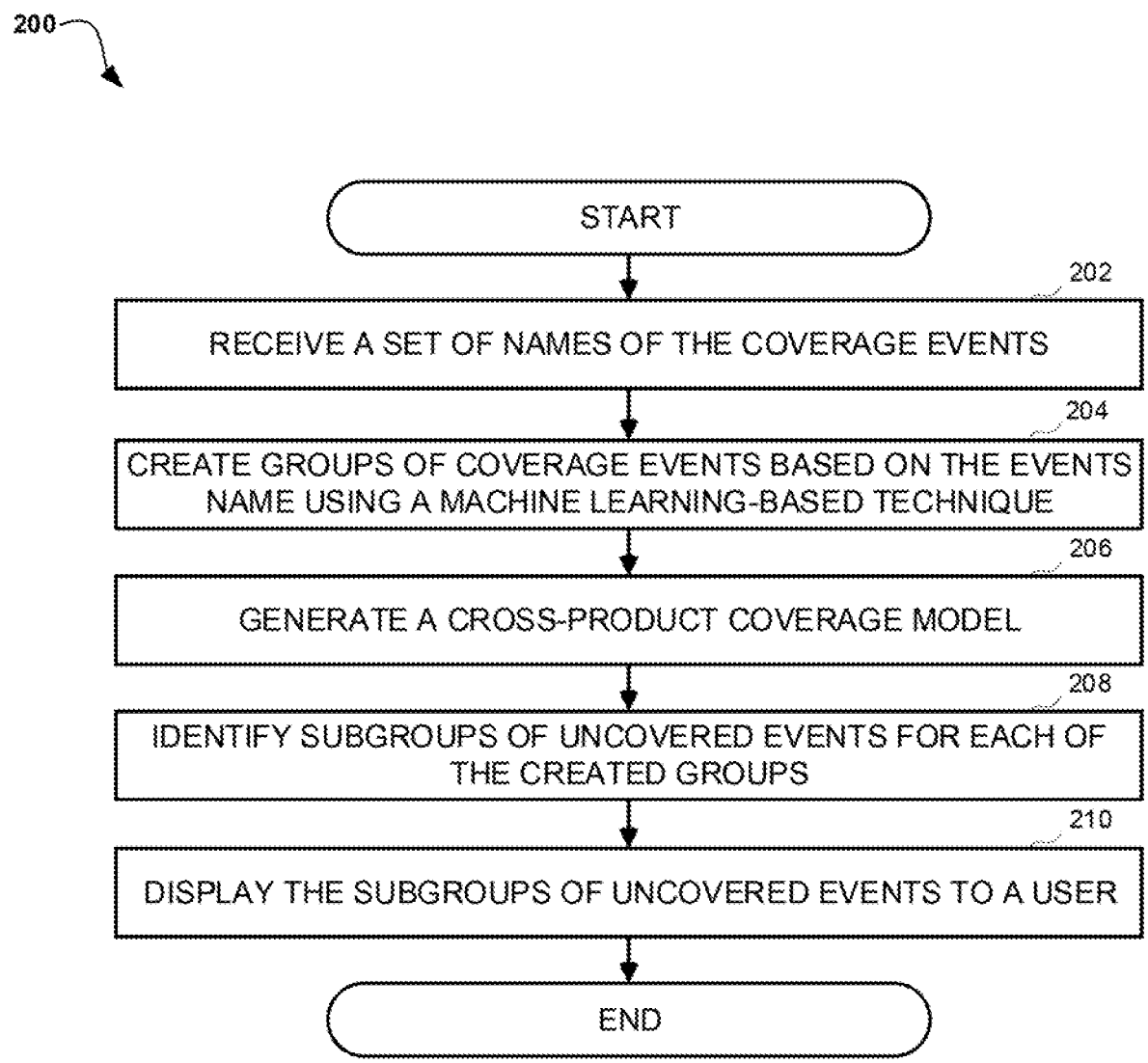
FIG. 2 is an operational flowchart illustrating an event clustering process according to at least one embodiment.

Referring now to FIG. 2, an operational flowchart illustrating an event clustering process 200 is depicted according to at least one embodiment. At 202, the event clustering program 110A, 110B receives a set of a names of the coverage events. According to an example embodiment, event clustering program 110A, 110B may receive a set of names of the coverage events from a verification platform. A verification platform 118 may be an automatic tool (a combination of software and hardware) that produces a large amount of data that is essential for understanding the state and progress of the verification process. For example, the verification tool may be a Verification Cockpit® (VC) platform (VC and all VC based trademarks and logos are trademarks or registered trademarks of International Business Machines Corporation and/or its affiliates) that is designed to collect, process, and analyze verification data. The verification data may be stored on a server database, such as database 116.

Then, at 204, the event clustering program 110A, 110B creates groups of coverage events (clusters) based on the event names using a machine learning-based technique. According to an example embodiment, event clustering program 110A, 110B may treat each event as a set of words. For example, if each event has a '_' boundary, the event clustering program 110A, 110B may break the event name into a set of names by extracting words between the '_' boundaries. Then, event clustering program 110A, 110B may use unsupervised learning clustering of the sets of words that represent event names. For example, event clustering program 110A, 110B may use a machine learning algorithm as a Latent Dirichlet Allocation (LDA) algorithm. The LDA algorithm allows sets of observations, such as words, to be explained by unobserved groups that explain why some parts of the data are similar. According to an example embodiment, event clustering program 110A, 110B may use K-means for performance reasons. In addition, and contrary to classic text classifications, event clustering program 110A, 110B may use a K-means algorithm that considers the location of each word in the event name and thus, break the event name into a list of words, and not a bag of words, as classic text classification under typical K-means or LDA approaches.

Next, at 206, the event clustering program 110A, 110B generates a cross-product coverage model from each cluster. According to an example embodiment, event clustering program 110A, 110B may determine and treat each word with a certain location in the event name that is common to all the events in the cluster as an anchor of the space. Typically, anchors are used to identify events that belong to the group. Locations that have more than one possible word are treated as attributes or dimensions of the cross-product. For example, the event clustering program 110A, 110B may receive the following group of events {add_with_no_exception; add_with_instruction_segmentation_exception; load_with_no_exception, load_with_instruction_segmentation_exception; and load_with_alignment_exception} and generate a cross-product coverage model that has two anchors—"with" as the second word and "exception" as the last word in each event name. Afterwards, the event clustering program 110A, 110B may determine the attributes of the resulting cross product that are {add, load} for the first word and {no, instruction_segmentation, alignment} for the 3-(–2) words. Note that the event clustering program 110A, 110B may look at the list of words comprising the event names in both directions, which allow to find attributes with varying number of words.

Then, in order to find large cross-products, event clustering program 110A, 110B may combine close cross products. For example, event clustering program 110A, 110B may combine cross products that differ in one attribute only into a larger cross-product and thus, reshape cross-products to improve the cross product density. The cross product density may be determined by the ratio between the size of the cross-product space and the number of events in the space. In another embodiment, event clustering program 110A, 110B may combine cross products that differ in a predefined number of attributes, where the predefined number may be set either by the user or by the machine learning algorithm. In further embodiments, the reshaping may be done by removing redundant attributes and/or breaking large multi-word attributes to smaller attributes.

Next, at 208, the event clustering program 110A, 110B identifies subgroups of uncovered events for each of the created groups. According to an example embodiment, event clustering program 110A, 110B may use the cross-product "hole" analysis technique. Typically, hole analysis, is a method for discovering and reporting large uncovered spaces for cross-product functional coverage models. Hole analysis groups together sets of uncovered events that share some common properties, thus allowing the coverage tool to provide shorter and more meaningful coverage reports to the user. The "hole" analysis algorithm is based on scanning all the sub spaces in the model space, from the individual events to the entire space, and finds larger and larger holes by combining neighboring smaller holes. The algorithm then scans the sub spaces back from the entire space to the individual events, to collect the holes and discard smaller holes that are included inside them. The "hole" analysis assists in providing concise and informative representation for sub-spaces that are not covered during a verification. For example, if in the group {add_with_no_exception; add_with_instruction_segmentation_exception; load_with_no_exception; load_with_instruction_segmentation_exception; and load_with_alignment_exception} that is presented as a cross-product as shown above, the events add_with_instruction_segmentation_exception and load_with_instruction_segmentation_exception, hole analysis displays these events as (*, instruction_segmentation). This means that all instructions (the first attribute) have not received the "instruction_segmentation" of the second attribute.

In another example, in order to find the largest hole containing a core event, the event clustering program 110A, 110B may start with the core event and use an aggregation technique to find the largest hole around the event. The decision on the growth direction may, for example, be influenced by a query requirement and specific semantic knowledge. In another embodiment, the event clustering program 110A, 110B may use clustering algorithms to find a set of uncovered events around the core event. The distance measure for the clustering algorithm may reflect a specific query requirements and the semantics of the coverage model. For example, Lee or Humming distance may be used by the event clustering program 110A, 110B to find the largest cluster (and thus the largest hole) around a core event. A special case for this method may occur when the clustering is done based on measures in the test directive domain.

In further embodiments, the event clustering program 110A, 110B may identify subgroups of uncovered events by using a quasi-hole technique in instances where the percentage of subsumed coverage events that have been covered is less than a threshold and the covered events are relatively uniformly spread within this space. That is, if a lightly-covered space contains another large space that is either a pure hole or has a significantly lower coverage percentage, such that the space without the subspace is not lightly covered, then the event clustering program 110A, 110B may select the purer subspace to be displayed instead of the larger lightly-covered space. In addition, the threshold for quasi-holes may be a predetermined percentage of the events in the hole. Yet in another embodiment, the definition of the threshold may be significantly lower coverage than the coverage in the neighborhood of the space. A more formal definition for a quasi-hole in cross-product space may be used by the event clustering program 110A, 110B may such as: Let CP be a cross product space. CP is a quasi-hole if its coverage is below the threshold, and for all CP' ⊂ CP, the coverage of CP-CP' is also below the threshold.

Next, at 210, the event clustering program 110A, 110B displays the subgroups of uncovered events to a user. According to an example embodiment, event clustering program 110A, 110B may present, using a Graphical User Interface, the clustering results in a table that comprises a unit name, a total number of events, a number of total clusters, a number of large clusters, and a number of events in clusters, where events in cluster may show a percentage value of the events in clusters to total events for each unit.

It may be appreciated that FIG. 2 provides only an illustration of one implementation and does not imply any limitations with regard to how different embodiments may be implemented. Many modifications to the depicted environments may be made based on design and implementation requirements. For example, in another embodiment, the event clustering program 110A, 110B may analyze the clustering results and based on a percentage value being below a threshold, generate a validation sequence that will increase the number of events in a particular cluster where the "hole" was discovered.

Figure 3:
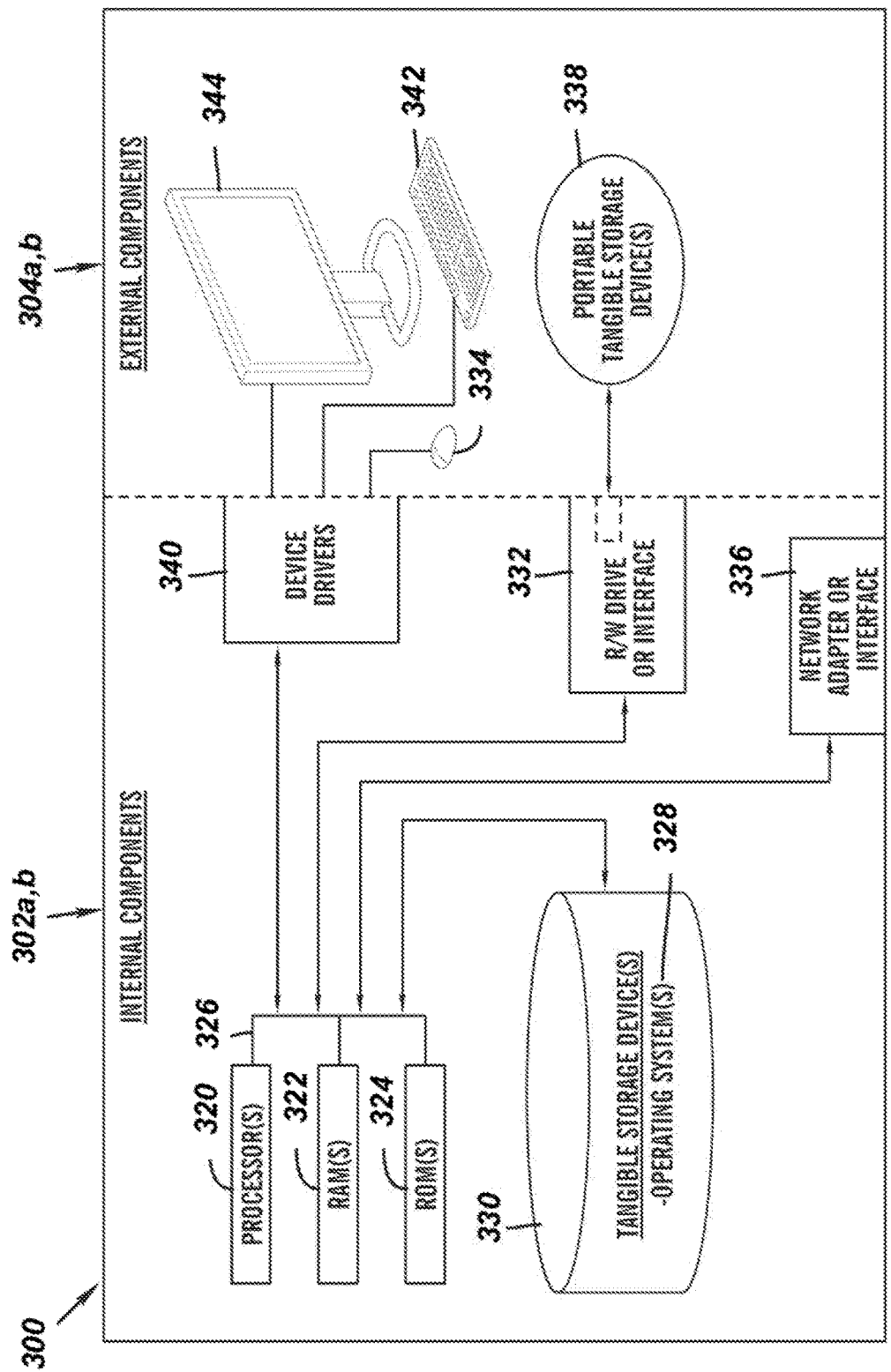
FIG. 3 is a block diagram of internal and external components of computers and servers depicted in FIG. 1 according to at least one embodiment.

FIG. 3 is a block diagram 300 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The client computing device 102 and the server 112 may include respective sets of internal components 302 a,b and external components 304 a,b illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the software program 108 and the event clustering program 110A in the client computing device 102, and the event clustering program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302 a,b also includes a R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the event clustering program 110A, 110B, can be stored on one or more of the respective portable computer-readable tangible storage devices 338, read via the respective R/W drive or interface 332, and loaded into the respective hard drive 330.

Each set of internal components 302 a,b also includes network adapters or interfaces 336 such as a TCP/IP adapter cards, wireless Wi-Fi interface cards, or 3G or 4G wireless interface cards or other wired or wireless communication links. The software program 108 and the event clustering program 110A in the client computing device 102 and the event clustering program 110B in the server 112 can be downloaded to the client computing device 102 and the server 112 from an external computer via a network (for example, the Internet, a local area network or other, wide area network) and respective network adapters or interfaces 336. From the network adapters or interfaces 336, the software program 108 and the event clustering program 110A in the client computing device 102 and the event clustering program 110B in the server 112 are loaded into the respective hard drive 330. The network may comprise copper wires, optical fibers, wireless transmission, routers, firewalls, switches, gateway computers and/or edge servers.

Each of the sets of external components 304 a,b can include a computer display monitor 344, a keyboard 342, and a computer mouse 334. External components 304 a,b can also include touch screens, virtual keyboards, touch pads, pointing devices, and other human interface devices. Each of the sets of internal components 302 a,b also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
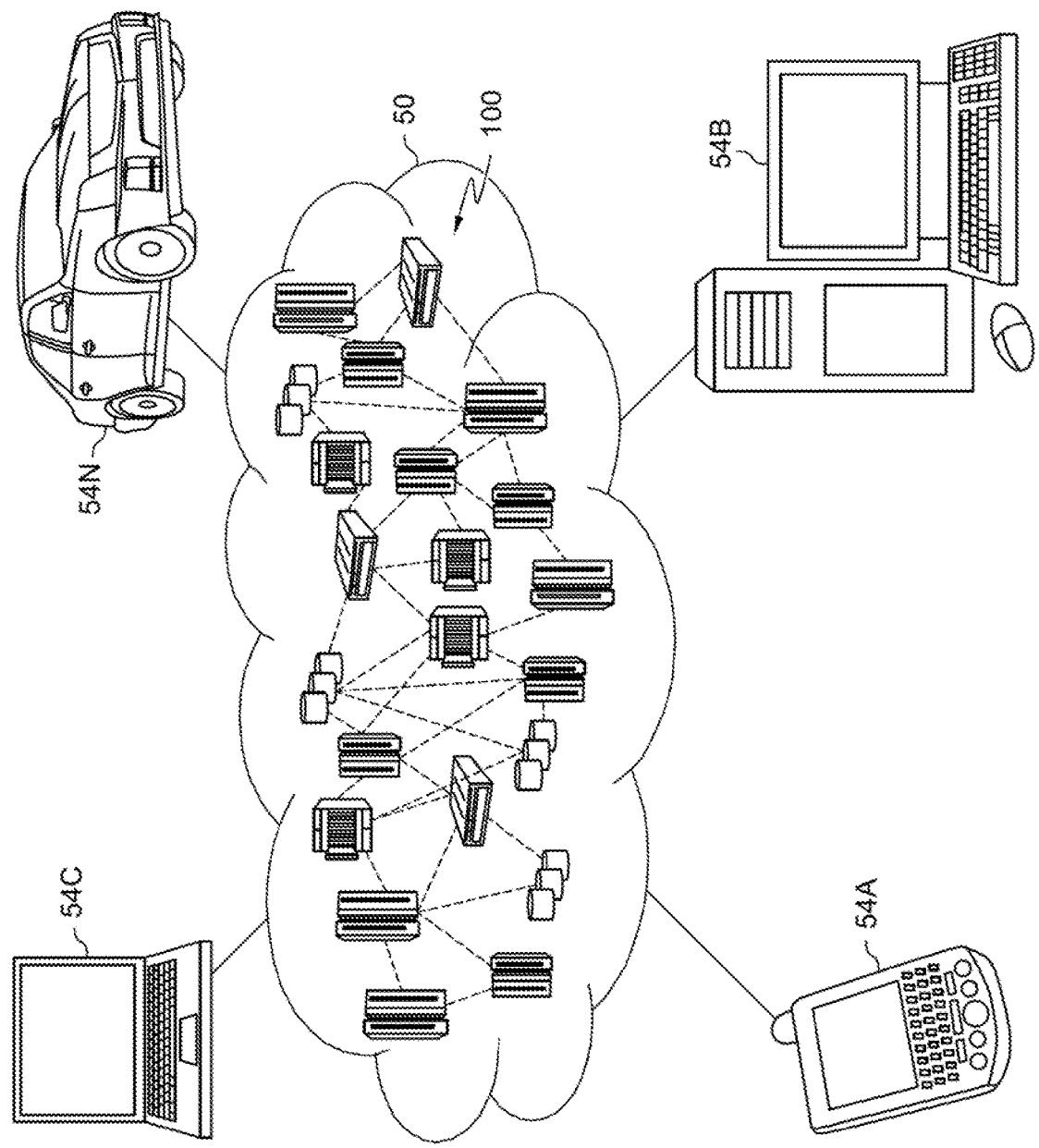
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
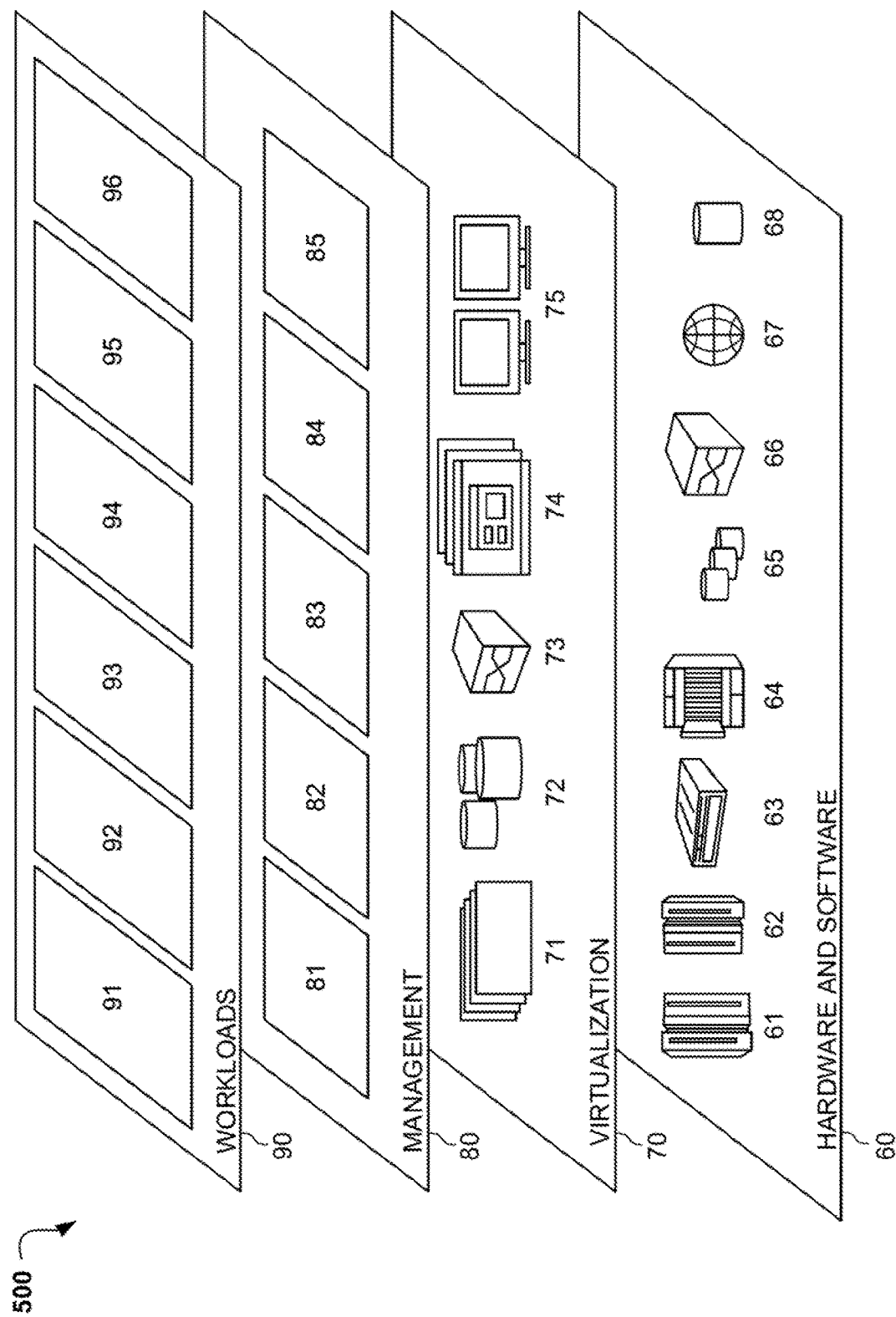
FIG. 5 depicts abstraction model layers according to an embodiment of the present invention.

Referring now to FIG. 5, a set of functional abstraction layers 500 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and coverage analysis improvement 96. Coverage analysis improvement 96 may relate to an improved coverage analysis that is based on clustering, using a machine learning technique of the coverage events and mapping the clusters into cross-product coverage spaces in order to determine large coverage holes in instances when the coverage events are individually defined.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for event clustering, the method comprising:
   receiving a set of names of coverage events;
   creating, by a machine learning-based technique, groups from the set of received names of the coverage events based on the set of names of the coverage events, wherein the machine learning-based technique uses a K-means algorithm that considers a location of each word in the set of names for clustering the set of names in the created groups and maps the clustered set of names into cross product spaces;
   determining a cross product density for the cross product spaces using a ratio between a size of a cross product space and a number of events in the cross product space;
   generating a cross product coverage model from the created groups, wherein generating the cross product coverage model comprises:
      determining one or more anchors of a cross product space based on a word with a certain location in an event name that is common to all event names in a cluster;
      determining one or more attributes of the cross product space based on determining that locations in the event names have more than one possible word in the cluster; and
      generating the cross product coverage model based on the one or more anchors and the one or more attributes; and
   identifying subgroups of uncovered events for each of the created groups.

2. The method of claim 1 further comprising:
   displaying the identified subgroups of uncovered events in a table comprising a unit name, a total number of events, a number of total clusters, a number of large clusters, and a number of events in clusters, wherein the number of events in cluster represents a percentage value of the events in clusters to the number of total events for each unit.

3. The method of claim 1, wherein the machine learning-based technique is further based on a Latent Dirichlet Allocation (LDA) algorithm.

4. The method of claim 1, wherein generating the cross product coverage model from the created groups further comprises combining close cross products.

5. The method of claim 4, wherein the cross product density is a ratio between a size of the cross-product space and a number of events in the cross-product space.

6. A computer system for event clustering, the computer system comprising:
  one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
  receiving a set of names of coverage events;
  creating, by a machine learning-based technique, groups from the set of received names of the coverage events based on the set of names of the coverage events, wherein the machine learning-based technique uses a K-means algorithm that considers a location of each word in the set of names for clustering the set of names in the created groups and maps the clustered set of names into cross product spaces;
  determining a cross product density for the cross product spaces using a ratio between a size of a cross product space and a number of events in the cross product space;
  generating a cross product coverage model from the created groups, wherein generating the cross product coverage model comprises:
    determining one or more anchors of a cross product space based on a word with a certain location in an event name that is common to all event names in a cluster;
    determining one or more attributes of the cross product space based on determining that locations in the event names have more than one possible word in the cluster; and
    generating the cross product coverage model based on the one or more anchors and the one or more attributes; and
  identifying subgroups of uncovered events for each of the created groups.

7. The computer system of claim 6, further comprising displaying the identified subgroups of uncovered events in a table comprising a unit name, a total number of events, a number of total clusters, a number of large clusters, and a number of events in clusters, wherein the number of events in cluster represents a percentage value of the events in clusters to the number of total events for each unit.

8. The computer system of claim 6, wherein the machine learning-based technique is further based on a Latent Dirichlet Allocation (LDA) algorithm.

9. The computer system of claim 6, wherein generating the cross product coverage model from the created groups further comprises combining close cross products.

10. The computer system of claim 9, wherein the cross product density is a ratio between a size of the cross-product space and a number of events in the cross-product space.

11. A computer program product for event clustering, the computer program product comprising:
  one or more computer-readable tangible storage medium and program instructions stored on at least one of the one or more tangible storage medium, the program instructions executable by a processor, the program instructions comprising:
  program instructions to receive a set of names of coverage events;
  program instructions to create, by a machine learning-based technique, groups from the set of received names of the coverage events based on the set of names of the coverage events, wherein the machine learning-based technique uses a K-means algorithm that considers a location of each word in the set of names for clustering the set of names in the created groups and maps the clustered set of names into cross product spaces;
  program instructions to determine a cross product density for the cross product spaces using a ratio between a size of a cross product space and a number of events in the cross product space;
  program instructions to generate a cross product coverage model from the created groups, wherein generating the cross product coverage model comprises:
    determining one or more anchors of a cross product space based on a word with a certain location in an event name that is common to all event names in a cluster;
    determining one or more attributes of the cross product space based on determining that locations in the event names have more than one possible word in the cluster; and
    generating the cross product coverage model based on the one or more anchors and the one or more attributes; and
  program instructions to identify subgroups of uncovered events for each of the created groups.

12. The computer program product of claim 11 further comprising program instructions to display the identified subgroups of uncovered events in a table comprising a unit name, a total number of events, a number of total clusters, a number of large clusters, and a number of events in clusters, wherein the number of events in cluster represents a percentage value of the events in clusters to the number of total events for each unit.

13. The computer program product of claim 11, wherein the machine learning-based technique is further based on a Latent Dirichlet Allocation (LDA) algorithm.

14. The computer program product of claim 11, wherein program instructions to generate the cross product coverage model from the created groups further comprises program instructions to combine close cross products.

15. The computer program product of claim 14, wherein the cross product density is a ratio between a size of the cross-product space and a number of events in the cross-product space.

* * * * *